United States Patent Office 3,385,825
Patented May 28, 1968

3,385,825
FIBER-FORMING POLYKETONES
Isaac Goodman and James Eric McIntyre, Harrogate, England, assignors to Imperial Chemical Industries Limited, London, England, a corporation of Great Britain
No Drawing. Filed Oct. 28, 1963, Ser. No. 319,532
Claims priority, application Great Britain, Dec. 28, 1962, 48,928/62
11 Claims. (Cl. 260—61)

This invention relates to high molecular weight polyketones.

It is known to prepare low molecular weight aromatic polyketones of the following formula:

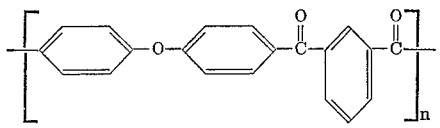

(See the paper by R. H. Michol and W. A. Murphey, Journal of Polymer Science, 1961, 55, pages 741 to 751.)

According to the present invention we provide high molecular weight polyketones, as hereinafter defined, containing the repeating unit:

—R—CO—R′—CO— where R is a radical of the formula:

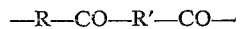

where

X is —O—A—O—, —S—, or —CH$_2$—O—CH$_2$—,
A is an alkylene diradical, and each aromatic nucleus may be unsubstituted as shown or substituted with from one to four substituents each of which may be an alkyl, fluoro, chloro or alkoxy radical,
R′ is (a) an aliphatic diradical, or (b) an aromatic diradical, the aromatic nucleus or nuclei of which may contain up to four substituents, each of which may be an alkyl, fluoro, chloro, bromo or alkoxy radical, or (c) a mixed alkyl/aryl diradical, the aromatic nucleus or nuclei of which may contain up to four substituents each of which may be either an alkyl, fluoro, chloro, bromo or alkoxy radical, or (d) a cycloaliphatic diradical, or (e) a direct linkage.

In the term polyketones we include copolyketones, which may be formed unavoidably when, for example, the polymer is prepared by a reaction as described hereinafter, and the diacid chloride can link in more than two positions to the second reactant (H—R—H) or which may be formed, for example, when the polymer is prepared by a reaction by, for example, the reaction of more than one diacid chloride with one or more of the compounds H—R—H or of one diacid chloride with more than one compound of the form H—R—H. Methods other than the Friedel-Crafts reaction can, of course, be used analogously to prepare the copolyketones.

The utility of our invention lies in the fact that the products are of high molecular weight and are therefore suitable to be converted into mouldings, shaped articles, coatings, films or adhesives. Products falling within the scope of our invention which are crystallisable and of high melting point are specially suitable for spinning into fibres and extruding or casting to form films.

The polymeric ketones of our invention may be prepared by a variety of methods among which are the following:

(1) The reaction of (a) a compound or compounds having the structure

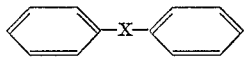

in which the benzene nuclei may be unsubstituted as shown or in which either or both may be substituted by from one to four substituents as hereinbefore defined provided that the 3 and/or 4-positions in each benzene nucleus are unsubstituted, and X is as defined hereinbefore, with (b) one or more di-acid di-chlorides.

This reaction may be carried out under the influence of a catalyst, such as aluminium trichloride, aluminium tribromide, boron trifluoride, hydrofluoric acid, ferric chloride, stannic chloride, titanium tetrachloride, phosphoric acid, phosphorus pentoxide (or mixtures of phosphoric acid and phosphorus pentoxide), hydrochloric acid, sulphuric acid and arylsulphonic acids.

Compounds includes in class (a) are, for example, the following: 1:2-diphenoxyethane; 1:3-diphenoxypropane; 1:4 - diphenoxy-butane; 1:3-diphenoxy-2:2-dimethylpropane; 1:10-diphenoxydecane; dibenzyl ether; 1:2-di-(2-methylphenoxy) ethane; 2:2′-dimethyldibenzyl ether; diphenyl sulphide; dibenzyl sulphide; α - ω - diphenylthio alkanes.

Suitable di-acid chlorides for this reaction include the following:

isophthaloyl chloride;
terephthaloyl chloride;
methoxyterephthaloyl chloride,
ethoxyterephthaloyl chloride,
propoxyterephthaloyl chloride,
isopropoxyterephthaloyl chloride,
fluoroterephthaloyl chloride,
chloroterephthaloyl chloride,
methylterephthaloyl chloride,
methylisophthaloyl chloride,
chloroisophthaloyl chloride,
alkoxyisophthaloyl chloride,
the diacid chloride of 4:4′-dicarboxydiphenylmethane,
the diacid of 3:3′-dicarboxydiphenylmethane,
dibenzyl-4:4′-dicarbonyl chloride,
phosgene,
oxalyl chloride,
adipoyl chloride,
sebacoyl chloride,
3-oxaglutaryl chloride,
3-methylglutaryl chloride,
2:2-dimethylmalonyl chloride,
dichloroterephthaloyl chloride,
dichloroisophthaloyl chloride,
dimethylterephthaloyl chloride,
dimethylisophthaloyl chloride,
diphenyl ether dicarbonyl chlorides,
naphthalene-1:4-, -1:5-, -2:6-, and -2:7- dicarbonyl chlorides,
homoterephthaloyl chloride,
homoisophthaloyl chloride,
meta- and para-phenylenediacetyl chlorides,
cyclopentane-1:3- dicarbonyl chlorides,
cyclohexane-1:3-, and 1:4-dicarbonyl chlorides,
furan-2:5-dicarbonyl chloride and
tetrahydrofuran-2:5-dicarbonyl chloride.

The reactants may conveniently be dissolved or dispersed in a suitable solvent, such for example as a chlorinated hydrocarbon, nitrobenzene or carbon bisulphide. The reaction may, in favourable cases, as demonstrated by Nenitzescu et al. (Ann., 1931, 491, 210) be carried out in the absence of catalyst.

(2) The reaction of a compound as hereinbefore defined in (a) with a di-acid or the anhydride of a diacid.

(3) The reaction of Grignard reagents of the formula:

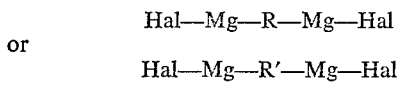

where R and R' are as defined above and Hal represents halogen, with a dinitrile or appropriate formula, followed by hydrolysis.

(4) A Friedel-Crafts reaction between compounds which may be regarded as intermediates in methods (1) and (2) above, although they may be prepared by other known methods. Thus self-condensation of compounds of the structure:

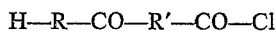

or condensation with H—R—H of compounds of the structure:

where R and R' are as hereinbefore defined, may be employed to give the products of this invention.

(5) Compounds included in our invention in the limited case where R=R' may be prepared by self condensation of compounds of the structure:

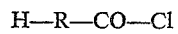

The following examples in which all parts are by weight, illustrate, but do not limit, the scope of our invention.

EXAMPLE 1

Poly(sebacoyl-1:2-diphenoxyethane)

A mixture of aluminium chloride (9.35 parts) and dry methylene chloride (33.5 parts) was cooled to −70° C. with stirring, then a solution of 1:2-diphenoxyethane (5.35 parts) and sebacoyl chloride (6.0 parts) in dry methylene chloride (33.5 parts) was added. The temperature was adjusted to −70° C. and after 10 minutes the temperature was allowed to rise to room temperature. The mixture was poured into dilute hydrochloric acid, the methylene chloride was boiled off, and the product was filtered off, washed with dilute hydrochloric acid and water, and dried. The polymer had a viscosity ratio, measured for a 1% solution in orthochlorophenol at 25° C., of 1.32, and a crystalline melting point of 210–223° C.

EXAMPLE 2

Poly(sebacoyl-1:4-diphenoxybutane)

This polymer, prepared as in Example 1 but using 1:4-diphenoxybutane (6.0 parts) instead of 1:2-diphenoxyethane, had a crystalline melting point of 201–212° C.

EXAMPLE 3

Poly(sebacoyldiphenyl sulphide)

A mixture of methylene chloride (67 parts), aluminium chloride (9.35 parts), and diphenyl sulphide (4.65 parts) was cooled to −60° C., then sebacoyl chloride (6.0 parts) was added with stirring. The mixture was cooled to −70° C. and allowed to warm up to room temperature during 4 hours. The mixture was then added to cold dilute hydrochloric acid, the methylene chloride was boiled off and the product isolated, washed and dried. The polymer melted at 173–178° C.

EXAMPLE 4

Poly(sebacoyldibenzyl ether)

To a stirred mixture of aluminium chloride (9.35 parts) in dry methylene chloride (26.8 parts) at −70° C. was added sebacoyl chloride (6.0 parts), followed after 5 minutes by a solution of dibenzyl ether (5.0 parts) in methylene chloride (40.2 parts). The reaction mixture was allowed to warm up during 3 hours to room temperature then poured into cold dilute hydrochloric acid. The product was filtered off, washed with water, and dried. The infra-red spectrum showed the product to be a polyketone, in contrast to the product from dibenzyl ether and aluminium chloride in methylene chloride, which was a polymeric hydrocarbon.

EXAMPLE 5

Poly(isophthaloyl-1:2-diphenoxy ethane)

Dry methylene chloride (200 parts) was cooled to −80° C. and aluminium chloride (6.6 parts), 1:2-diphenoxyethane (4.28 parts) and a solution of isophthaloyl chloride (4.06 parts) in dry methylene chloride (50 parts) were successively added with stirring. After 2 hours at −70° C., the mixture was allowed to warm up to room temperature and kept at room temperature overnight. The mixture was added to dilute hydrochloric acid and methylene chloride was boiled off on a steam bath. The product was isolated, dried and reprecipitated from ortho-chlorophenol solution with methanol. The product, poly(isophthaloyl-1:2-diphenoxy ethane), melted with the disappearance of birefringence at 220–225° C. and could be melt-spun to form fibers.

What we claim is:

1. High molecular weight polyketones consisting of at least one of the repeating units

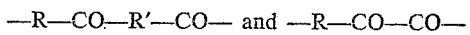

where R is a diradical having the formula:

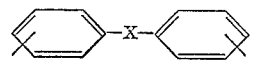

wherein X is selected from the group consisting of

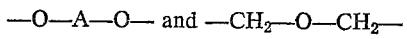

A is an alkylene diradical containing 1–10 carbon atoms, each aromatic nucleus being unsubstituted; R' is a member chosen from the group consisting of (a) an alkylene diradical containing 1 to 9 carbon atoms, (b) an aromatic diradical the aromatic nuclei of which contain at most four substituents each of which is chosen from the group consisting of methyl, fluoro, chloro, bromo and lower alkoxy radicals, (c) a mixed alkyl/aryl diradical the aromatic nuclei of which contain at most four substituents each of which is chosen from the group consisting of methyl, fluoro, chloro, bromo and lower alkoxy radicals, and (d) a cycloaliphatic diradical selected from the group consisting of cyclohexyl and cyclopentyl.

2. High molecular weight polyketones according to claim 1 in which X is —OCH$_2$CH$_2$O—.

3. High molecular weight polyketones according to claim 1 in which X is —O(CH$_2$)$_4$O—.

4. High molecular weight polyketones according to claim 1 in which X is —CH$_2$—O—CH$_2$—.

5. High molecular weight polyketones according to claim 1 in which R' is an alkylene diradical containing 1–9 carbon atoms.

6. High molecular weight polyketones according to claim 1 in which R' is —(CH$_2$)$_8$—.

7. High molecular weight polyketones according to claim 1 in which R' is an aromatic diradical.

8. High molecular weight polyketones according to claim 1 in which R' is phenylene.

9. High molecular weight polyketones according to claim 1 in which R' is meta-phenylene.

10. A fiber prepared from the product of claim 1.
11. A film prepared from the product of claim 1.

References Cited

UNITED STATES PATENTS 3,065,205  11/1962  Booner _____ 260—47

WILLIAM H. SHORT, *Primary Examiner.*

C. A. WENDEL, L. LEE, *Assistant Examiners.*